United States Patent [19]

Kokubun

[11] Patent Number: 5,134,384
[45] Date of Patent: Jul. 28, 1992

[54] DATA COINCIDENCE DETECTING CIRCUIT

[75] Inventor: Hitoshi Kokubun, Tokyo, Japan

[73] Assignee: Oki Electric Industry Co., Ltd., Tokyo, Japan

[21] Appl. No.: 486,593

[22] Filed: Feb. 28, 1990

[30] Foreign Application Priority Data

Mar. 2, 1989 [JP] Japan .................... 1-50779

[51] Int. Cl.⁵ .............................................. G06F 7/02
[52] U.S. Cl. .................................................. 340/146.2
[58] Field of Search ....................... 340/146.2; 364/769

[56] References Cited

U.S. PATENT DOCUMENTS

| | | | |
|---|---|---|---|
| 4,225,849 | 9/1980 | Lai | 340/146.2 |
| 4,263,664 | 4/1981 | Owen et al. | 365/185 |
| 4,326,134 | 4/1982 | Owen et al. | 307/268 |
| 4,393,481 | 7/1983 | Owen et al. | 365/228 |
| 4,404,475 | 9/1983 | Drori et al. | 365/185 |
| 4,450,432 | 5/1984 | Schmidtpott et al. | 340/146.2 |
| 4,617,652 | 10/1986 | Simko | 365/203 |
| 4,668,932 | 5/1987 | Drori et al. | 365/46 X |
| 4,694,274 | 9/1987 | Shimada et al. | 340/146.2 |
| 4,841,279 | 6/1989 | Walters, Jr. | 340/146.2 |
| 4,891,534 | 1/1990 | Kanoh | 340/146.2 X |
| 4,899,127 | 2/1990 | Kawai et al. | 340/146.2 |
| 4,903,005 | 2/1990 | Sakashita et al. | 340/146.2 |
| 4,933,662 | 6/1990 | Szczepanek | 340/146.2 |
| 4,935,719 | 6/1990 | McClure | 340/146.2 |
| 5,003,286 | 3/1991 | Carbonaro et al. | 340/146.2 |

FOREIGN PATENT DOCUMENTS 56-120224  2/1980  Japan .

Primary Examiner—Tan V. Mai
Attorney, Agent, or Firm—Edward D. Manzo

[57] ABSTRACT

The data coincidence detecting circuit detects the coincidence of first data having bits with second data having bits. The data coinincidence detecting circuit includes input lines, with the bits of the first data being supplied to respectively, a first storing circuit having first storing elements to store the bits of the first data therein and a second storing circuit having second storing elements to store the bits of the second data therein. The first element has first and second terminals and an input terminal connected to the input line through a node. The second element has first and second terminals and is connected to the first element. The first and second elements have a function for electrically connecting between the first and second terminals when the stored bit is a first state and disconnecting between the first and second terminals when the stored bit is a second state. The data coincidence detecting circuit further comprises a first power supplying circuit connected to the first storing circuit to selectively supply a first electric potential and a second electric potential, a second power supplying circuit connected to the second data storing circuit to selectively supply the first potential and the second potential, a detecting circuit to detect the electric potential of the nodes and to output a detecting signal on an output terminal thereof and an output circuit connected to the output terminal of the detecting circuit to decide the coincidence of the first data and the second data by the detecting signal.

20 Claims, 8 Drawing Sheets

DATA COINCIDENCE DETECTING CIRCUIT

BACKGROUND OF THE INVENTION

The present invention relates to a data coincidence detecting circuit for comparing one data composed of a plurality of bits with the other data composed of a plurality of bits and determining whether the one data coincides with the other data, especially to those employed in a security circuit provided with two pairs of key codes for comparing one key code with the other key code and determining whether one key code coincides with the other key code.

Japanese Patent Laid-Open Publication No. 56-120224 discloses a comparing and detecting circuit for comparing one data composed of a plurality of bits with the other data composed of a plurality of bits and determining whether the former data coincides with the latter data. According to the known circuit, one bit in one data is each time compared with one bit in the other data and the compared result is stored in a latch circuit. Hence, many comparing operations are required to determine whether all the plurality of bits coincide with the other plurality of bits, which involved long processing time.

SUMMARY OF THE INVENTION

It is an object of the present invention to provide a data coincidence detecting circuit capable of determining whether one data composed of a plurality of bits coincide with the other data composed of a plurality of bits in a short processing time.

It is another object of the present invention to provide a data coincidence detecting circuit composed of a small number of elements and capable of determining whether one data composed of a plurality of bits coincide with the other data composed of a plurality of bits.

To achieve the above objects of the present invention, the data coincidence detecting circuit detects the coincidence of first data with second data. The data coincidence detecting circuit comprises input lines, with bits of the first data being supplied to a first storing circuit having first storing elements to store the bits of the first data therein, and a second storing circuit having second storing elements to store the bits of the second data therein. A first element has first and second terminals and an input terminal connected to the input line through a node. A second element has first and second terminals and is connected to the first element. The first and second elements are effective to electrically connect the first and second terminals when the stored bit is a first state and disconnecting the first from the second terminal when the stored bit is a second state. The data coincidence detecting circuit further comprises a first power supplying circuit connected to the first storing circuit to selectively supply a first electric potential and a second electric potential, a second power supplying circuit connected to the second data storing circuit to selectively supply the first potential and the second potential, a detecting circuit to detect the electric potential of the nodes and to output a detecting signal on an output terminal thereof, and an output circuit connected to the output terminal of the detecting circuit to decide the coincidence of the first data and the second data by the detecting signal.

The above and other objects, features and advantages of the present invention will become more apparent from the following description taken in conjunction with the accompanying drawings.

DESCRIPTION OF THE PREFERRED EMBODIMENT

Figure 1:
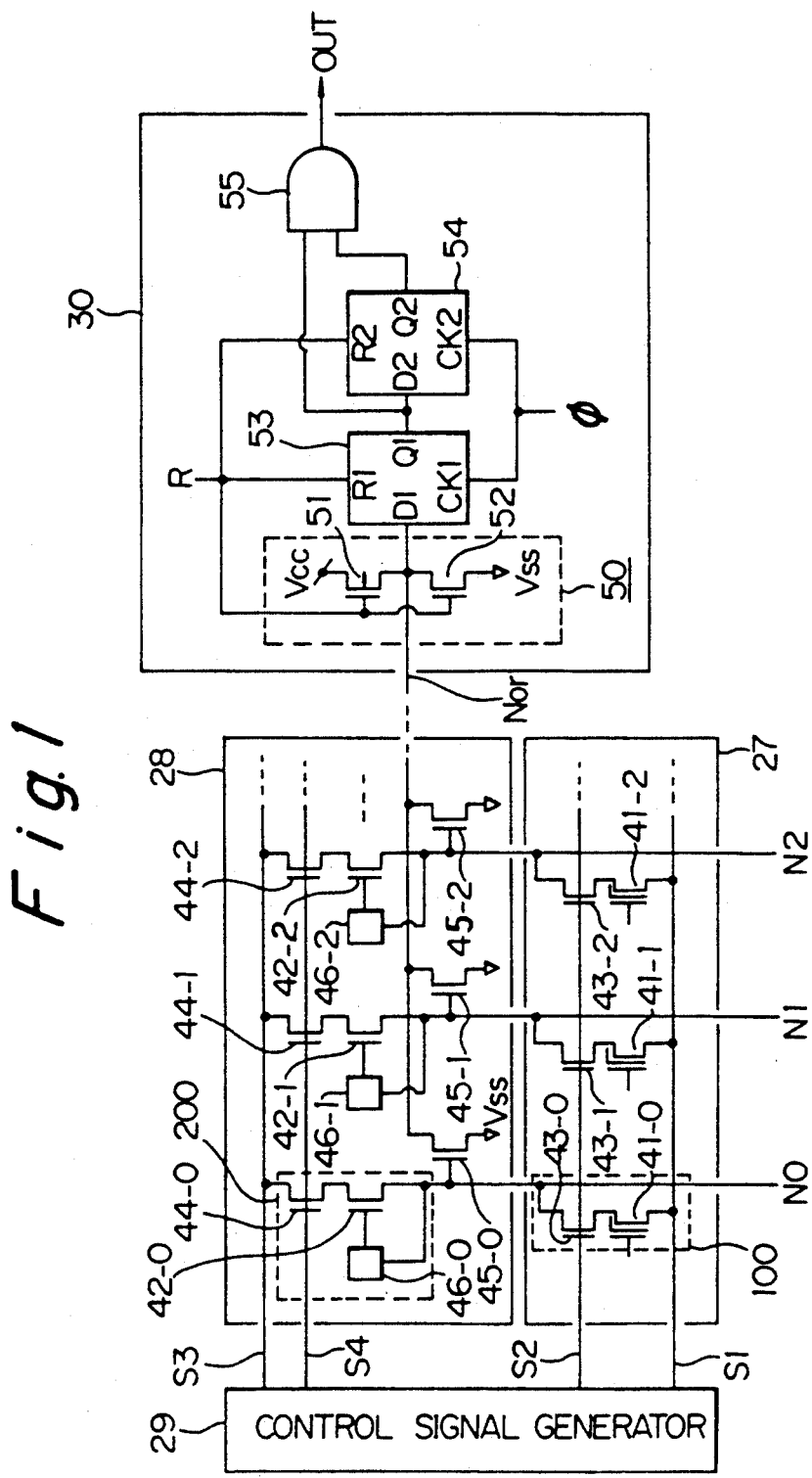
FIG. 1 is a circuit diagram of a comparing and detecting circuit for comparing one data composed of a plurality of bits with the other data composed of a plurality of bits and determining whether one data coincide with the other data according to a first embodiment of the present invention.
Figure 2:
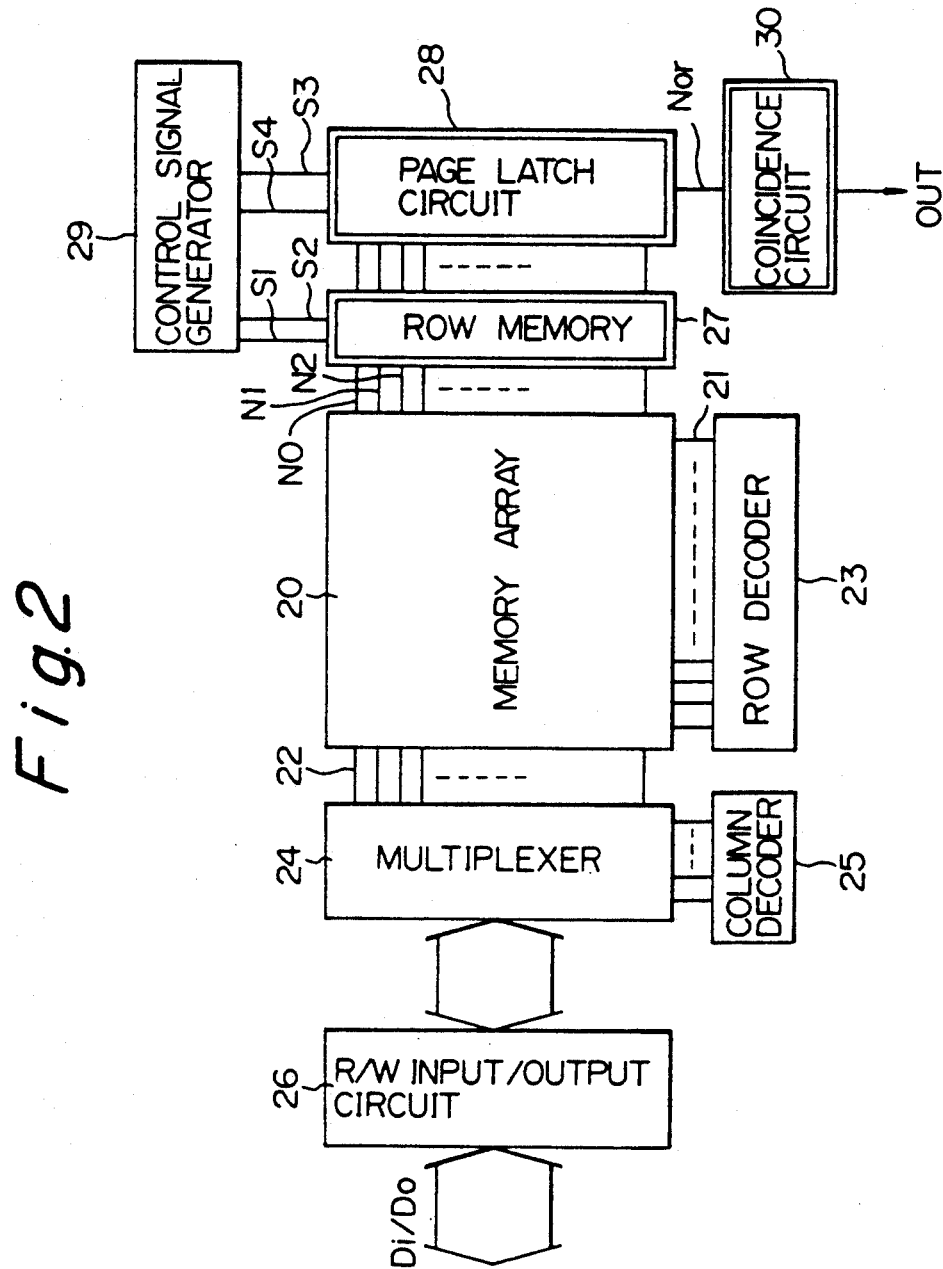
FIG. 2 is a block diagram of an EEPROM (electrically erasable programmable read only memory) having the circuit of FIG. 1.
Figure 3:
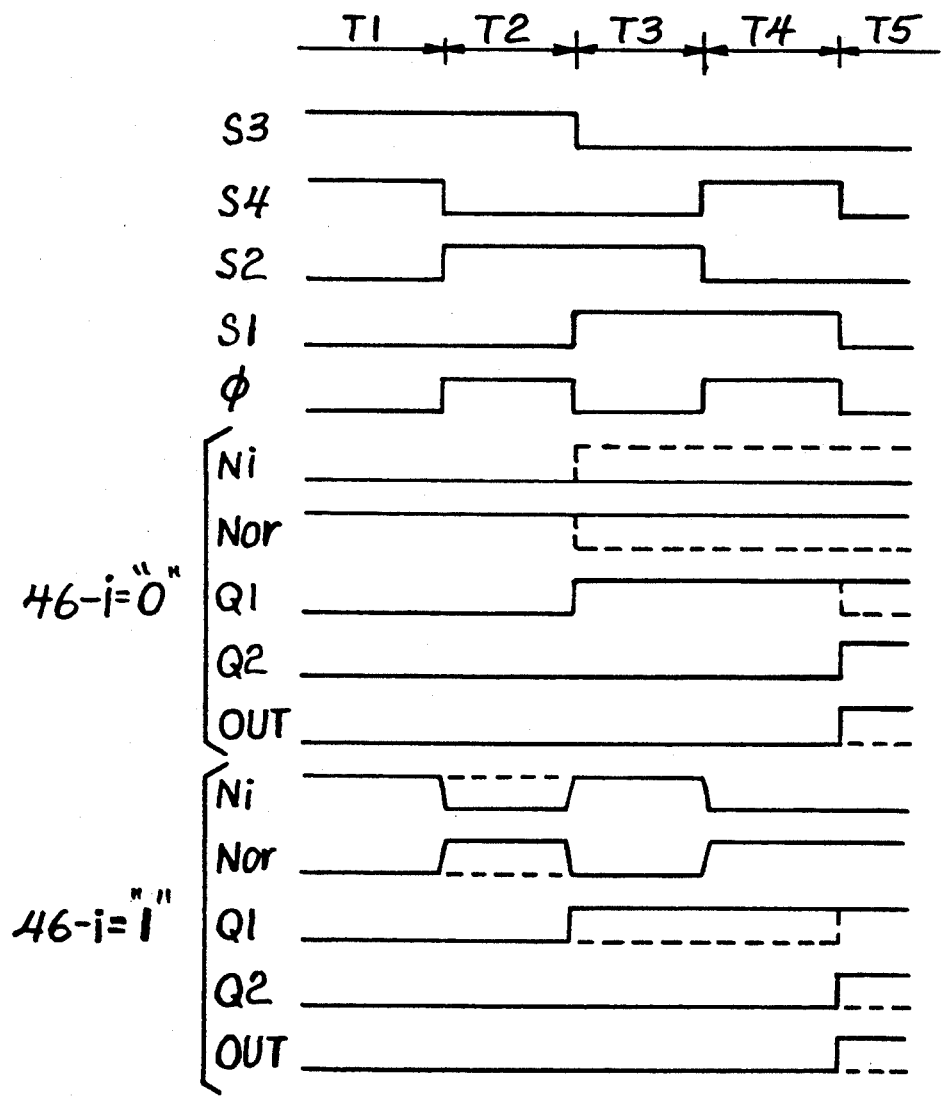
FIG. 3 is waveforms of signals provided when the circuit of FIG. 1 is operated.

First Embodiment (FIGS. 1 to 3)

A comparing and detecting circuit according to a first embodiment of the present invention will be described with reference to FIGS. 1 to 3.

The comparing and detecting circuit comprises, as illustrated in FIG. 1, a row memory 27, a page latch circuit 28, a control signal generator 29 and a coincidence circuit 30.

The row memory 27 stores therein predetermined data of comparison key code. The row memory 27 comprises a plurality of first FETs (field effect transistors each field effect transistor constitutes a cell of EEPROM) 41-0, 41-1, 41-2 . . . (hereinafter referred to as first FETs 41-i), and a plurality of third FETs 43-0, 43-1, 43-2 . . . (hereinafter referred to as third FETs 43-i) respectively connected in series to the first FETs 41-i. The first FETs 41-i have FLOTOX structure capable of storing predetermined data by charging positively and negatively on floating gate thereof. Each source of the first FETs 41-i is connected to a first control signal line S1 and each gate of the third FETs 43-i is connected to a second control signal line S2. Each source of the third FETs 43-i is connected to a respective one of a plurality of nodes N0, N1, N2 . . . (hereinafter referred to as Ni).

The page latch circuit 28 comprises a plurality of latch circuits 46-0, 46-1, 46-2 . . . (hereinafter referred to as 46-i) for storing input data key code which are compared with the comparison key code in the row memory 27, a plurality of second FETs 42-0, 42-1, 42-2 . . . (hereinafter referred to as second FETs 42-i), a plurality of fourth FETs 44-0, 44-1, 44-2 . . . (hereinafter referred to as fourth FETs 44-i) and a plurality of fifth FETs 45-0, 45-1, 45-2 . . . (hereinafter referred to as fifth FETs 45-i). The second FETs 42-i and the fourth FETs 44-i constitute N-channel enhancement-mode transistors in which the FET 42 and FET 44-0, FET 42-1 and FET 44-1, FET 42-2 and FET 44-2 . . . are connected in series to each other. Each gate electrode of the second FETs 42-i is connected to each output of the latch circuit 46-i and each source thereof is connected to each node Ni.

Each gate electrode of the fourth FETs 44-i is connected to a fourth control signal line S4 and each drain thereof is connected to a third control signal line S3. Each gate electrode of the fifth FETs 45-i is connected to each node Ni and each source is connected to a ground potential Vss and each drain thereof is connected to a common node Nor.

The coincidence circuit 30 comprises a common node potential control circuit 50 composed of an active pull-up P-channel FET 51 and an active pull-down N-channel FET 52, a first and a second flip flops 53, 54 (hereinafter referred to as FFs 53, 54) and an AND gate 55. The FETs 51, 52 are connected in series between a power supply terminal Vcc and the ground potential Vss and connected commonly to a reset signal line R at each gate electrode thereof while a source of the FET 51 and a drain of the FET 52 are connected to the common node Nor so that the FETs 51, 52 and the fifth FETs 45-i of the page latch circuit 28 constitute a NOR circuit. The first and the second FFs 53, 54 each has a function to receive an output of the Nor circuit at the trailing edge of a clock signal $\phi$ which is synchronous with signals supplied by the control signal lines S1 to S4. The first FF 53 has an input terminal D1 connected to the common node Nor, a reset terminal R1 connected to the reset signal line R, a clock terminal CK1 connected to a clock signal line CK and an output terminal Q1. The second FF 54 comprises an input terminal D2 connected to the output terminal Q1 of the first FF 53, a reset terminal R2 connected to the reset signal line R, a clock terminal CK2 connected to the clock signal line CK and an output terminal Q2. Both the output terminals Q1, Q2 of the first and the second FFs 53, 54 are connected to two input terminals of the AND gate 55 which provides an output signal OUT.

In the comparing and detecting circuit according to the first embodiment of the present invention, the data as a comparison key code are previously stored in the first FETs 41-i. The data are written in the first FETs 41-i in the same manner as made in the normal EEPROM. The first FETs 41-i are turned on when the data "1" (hereinafter referred to as simply "1") is written therein and turned off when the data "0" (hereinafter referred to as simply "0") is written therein.

When the first FETs 41-i is operated, the voltage of about 2 volts is applied to each gate of the first FETs 41-i. The nodes Ni are operated initially at low level (hereinafter referred to as "L") and is provided with a large capacity so that the logical level of the node Ni is not inverted due to a junction leakage current. Since the reset signal line R keeps "L" in the following operation, the common node Nor is charged by the power supply Vcc to be high level (hereinafter referred to as "H"). The fifth FETs 45-i are turned off since the nodes Ni are "L".

Waveforms of signals provided when the comparing and detecting circuit according to the first embodiment is operated are illustrated in FIG. 3.

The control signals S1 to S4 and the clock signal CK or $\phi$ are supplied at five steps T1 to T5 set forth in detail hereinafter.

When "0" is stored in the latch circuit 46-i, solid lines in FIG. 3 show that the FETs 41-i="0" and broken lines show that the FETs 41-i="1". On the other hand, when "1" is stored in the latch circuit 46-i, the solid lines in FIG. 3 show that the FETs 41-i="1" and the broken lines show that the FETs 41-i="0".

When the inputted key code is input by users from the input device (not shown), the data in the input key code is latched in the latch circuit 46-i in the page latch circuit 28 through the nodes Ni. When the key code "1" is latched in the latch circuit 46-i, the second FETs 42-i at the side of the output of the latch circuit 46-i are turned on. When the key code "0" is latched in the latch circuit 46-i, the second FETs 42-i is turned off.

In Step T1 of FIG. 3, the third and forth control signals S3, S4 are "H" and the first and the second control signals S1, S2 are "L" so that the fourth FETs 44-i are turned on whereby the nodes Ni are charged through the second FETs 42-i at the side of the output of the latch circuit 46-i wherein the key code "1" is latched. Accordingly, the fifth FETs 45-i, each having gate connected to the nodes Ni, are turned on and the common node Nor goes "L".

In Step T2, when the second control signal S2 goes "H", the control signal line S4 goes "L", the clock signal CK or $\phi$ goes "H", the third FETs 43-i are turned on and the fourth FETs 44-i are turned off. The data "1" and "0" have been previously stored in the first FETs 41-i. The first FETs 41-i storing the data "1" therein are turned on and the FETs 41-i storing the data "0" therein are turned off. Hence, when the third FETs 43-i are turned on, the nodes Ni at the side of the first FETs 41-i which store "1" through the third FETs 43-i are charged to the first control signal line S1 having "L" so that the nodes Ni go "L" from "H". If there is any Ni in a combination of the latch circuit 46-i="1" and the first FETs 41-i="0", the node Ni does not go "L" so that the fifth FETs 45-i connected to the node Ni are kept turned on and the common node Nor is kept "L".

In Step T3, when the control signal S1 goes "H", the third control signal S3 goes "L", the clock signal $\phi$ goes "L", the data in the common node Nor is latched in the first FF 53. At this time, the nodes Ni at the side of the first FETs 41-i which store "1" is charged up through the third FETs 43-i when the first control signal S1 goes up "H".

In Step 4, when the fourth control signal S4 goes "H", the nodes Ni at the side of the latch circuit 46-i which store "1" are discharged at the side of the third control signal S3 having "L" through the fourth FETs 44-i. If there is any node in a combination of the latch circuit 46-i="0" and the first FETs 41-i="1", the node Ni is kept "H" so that the fifth FETs 45-i connected to the node Ni is kept turned on and the common node Nor is kept "L".

In Step 5, when the first and forth control signals S1, S4 and the clock signal CK or $\phi$ go down "L", the data in the first FF 53 is latched in the second FF 54 and the data in the common node Nor is latched in the first FF 53. Only when both the outputs of the first and the second FFs 53, 54 are "H", the output signal OUT provided by the AND gate 55 goes "H". That is, when the comparison key code stored previously in the first FETs 41-i coincides with the input key code latched in the latch circuit 46-i, the output signal OUT goes "H".

FIG. 2 is a block diagram of the 256K bits EEPROM having a security function embodying the comparing and detecting circuit according to the first embodiment of the present invention.

The EEPROM having the security function is so structured that the part or the whole of the data can not be written in or can not be read out from the memory array 20 without inputting the key code.

The EEPROM comprises a memory array 20 having a plurality of memory cells, a row decoder 23 connected to the memory array 20 through 512 word lines 21 for decoding addresses, a multiplexer 24 connected to the memory array 20 through 512 bit lines 22 for selecting signals on the basis of an output signal issued by a column decoder 25 connected to the multiplexer 24 for a read/write input/output circuit (hereinafter referred to as R/W input/output circuit) 26 connected to the multiplexer 24, a row memory 27 connected to the memory array 20 through the nodes Ni to a control signal generator 29, the page latch circuit 28 connected to the row memory 27 and the control signal generator 29 and composed of the latch circuit for storing data to be written in the memory 20 and a comparing and detecting circuit for comparing the key code with other key code and the coincidence circuit 30 connected to the page latch circuit 28 through the common node Nor for providing an output signal OUT.

The R/W input/output circuit 26 comprises a sense amplifier and an input/output buffers for inputting a writein data Di and outputting a readout data Do.

The row memory 27 has the same memory cell as employed in the memory array 20 for adding one line to the memory array 20. The row memory 27 functions to store the key code therein and read out the key code stored therein on the basis of the first and the second control signals S1, S2 provided by the control signal generator 29. The page latch circuit 28 each is connected to each bit line and controlled by the third and the fourth signals S3, S4 supplied thereto from the control signal generator 29 and comprises the latch circuit for storing the data to write in the memory array 20 and the comparator for comparing the key code with the other key code. The page latch circuit 28 has the common node Nor at the output side thereof to which common node Nor the coincidence circuit 30 for providing the output signal OUT is connected.

The output signal OUT is employed as various control signals in the EEPROM. For example, when the output signal OUT is "H", the part or the whole of the data can be written in the memory array 20 or read out from the memory array 20. When the data stored in the memory array 20 is read out, one of the word lines 21 is selected by the row decoder 23 so that the data connected to the memory cell of the memory array 20 is provided to the bit line 22. Whereupon, one of the bit lines is selected by the column decoder 25 and the multiplexer 24 so that the data on the selected bit line 22 is amplified by the R/W input/output circuit 26 and provided as the readout data Do. When the data is written in the memory array 20, the writein data Di is latched in the page latch circuit 28 through the R/W input/output circuit 26, the multiplexer 24, the memory array 20 and the row line memory 27, and thereafter the writein data Di is written in the memory cell of the memory array 20 en block which memory cell is selected by the row decoder 23 and the multiplexer 24.

Figure 4:
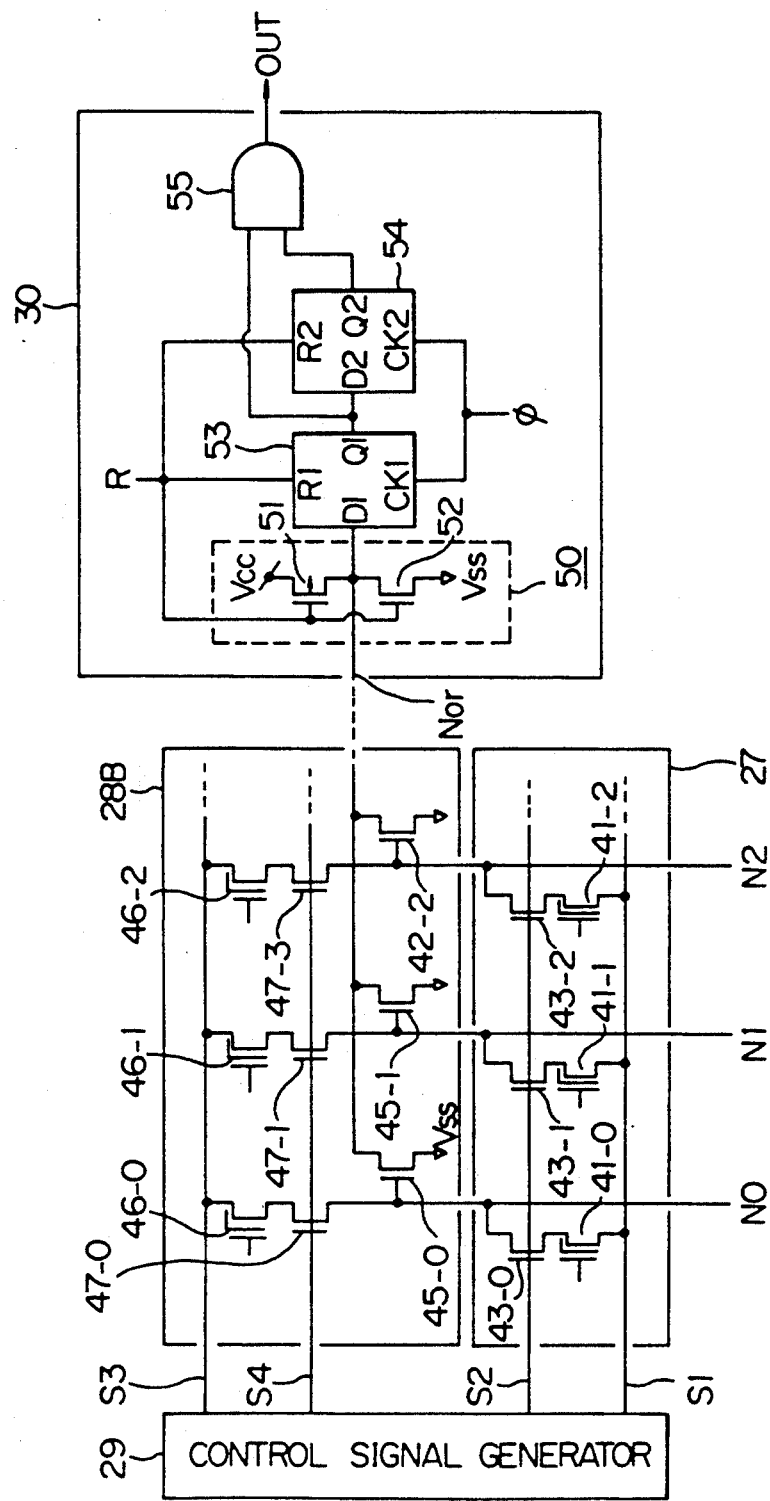
FIG. 4 is a circuit diagram of a comparing and detecting circuit according to a second embodiment of the present invention.

Second Embodiment (FIG. 4)

A comparing and detecting circuit according to a second embodiment of the present invention will be described with reference to FIG. 4.

The arrangement and the operation of the comparing and detecting circuit are same as those of the first embodiment except the page latch circuit, hence the explanation thereof is omitted.

A page latch circuit 28B comprises a plurality of sixth FETs 46-0, 46-1, 46-2 . . . each having FLOTOX structure and a plurality of seventh FETs 47-0, 47-1, 47-2 46-0, 46-1, 46-2 . . . for selectively connecting the sixth FETs to the nodes Ni.

As is evident from the arrangement of the comparing and detecting circuit according to the second embodiment, it is selectively connect the two FETs having the latch circuit in series or connect the FET having the FLOTOX arrangement to the other FET in series, which involve the same operations.

Figure 5:
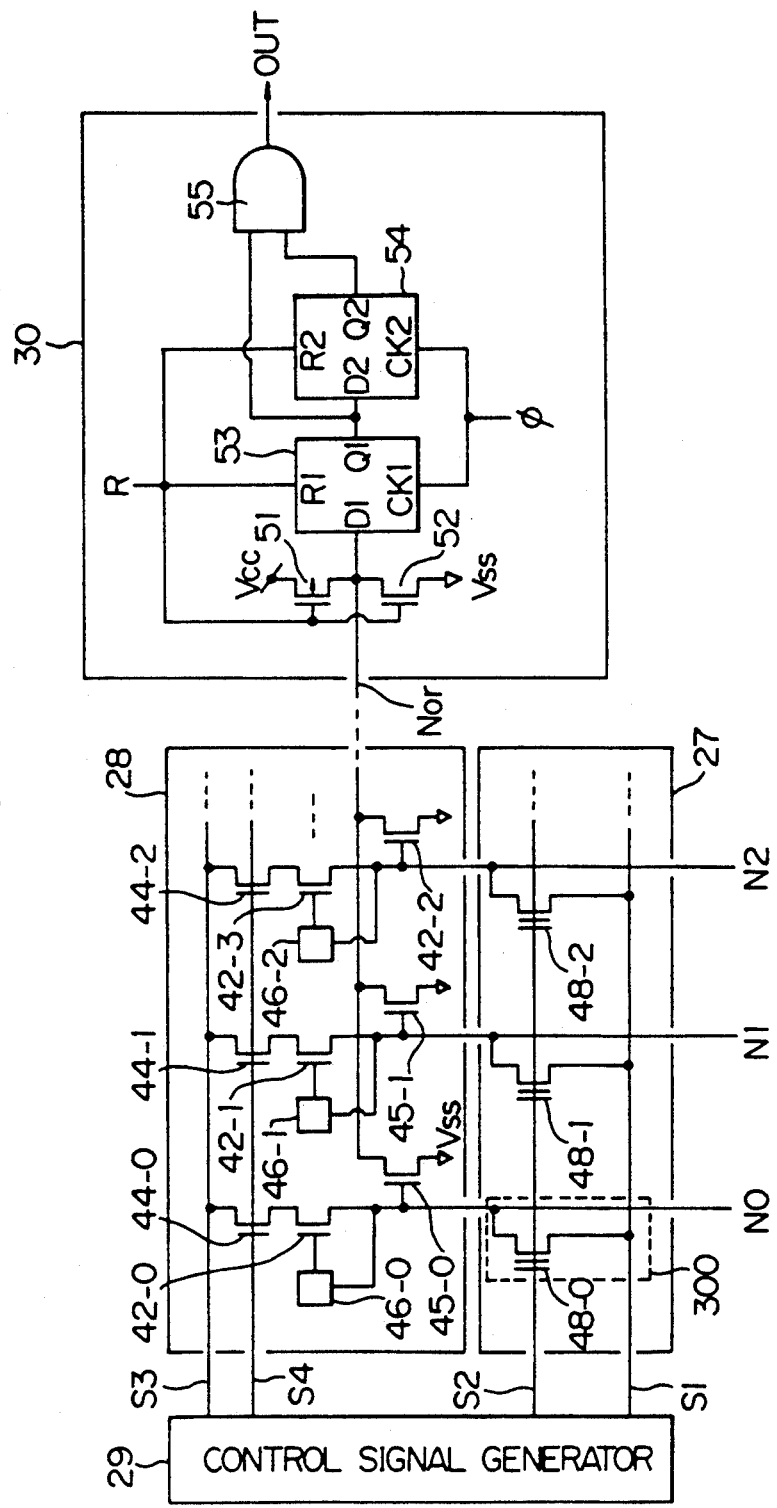
FIG. 5 is a circuit diagram of a comparing and detecting circuit according to a third embodiment of the present invention.

Third Embodiment (FIG. 5)

A comparing and detecting circuit according to a third embodiment of the present invention can be described with reference to FIG. 5.

The third FETs 43-i of the row line memory 27 is substituted by an EPROM (erasable programmable ROM) whereby the first FETs 41-i will be eliminated.

Figure 6:
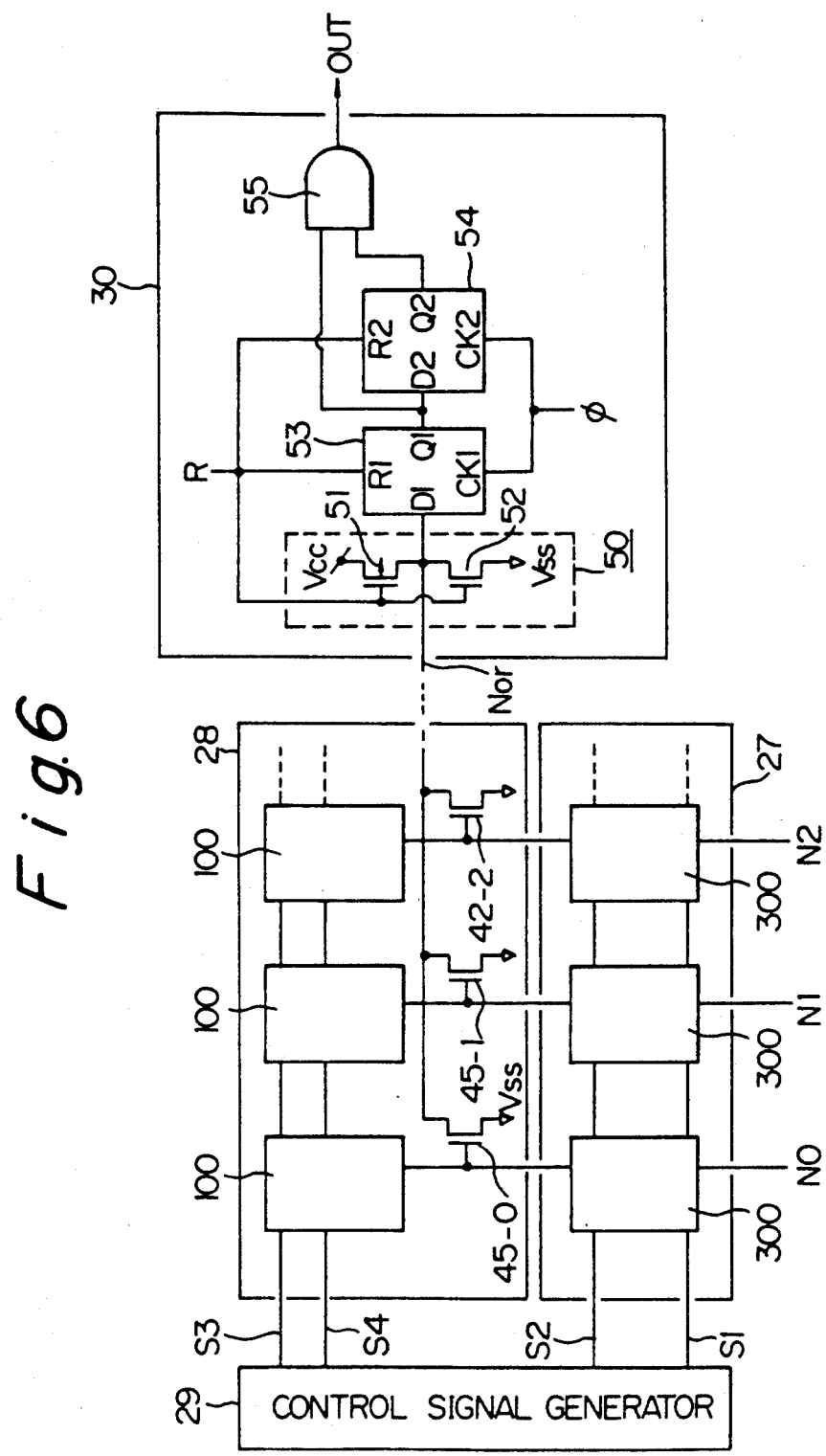
FIGS. 6 to 8 are circuit diagrams of comparing and detecting circuits according to fourth to fifth embodiments of the present invention.
Figure 7:
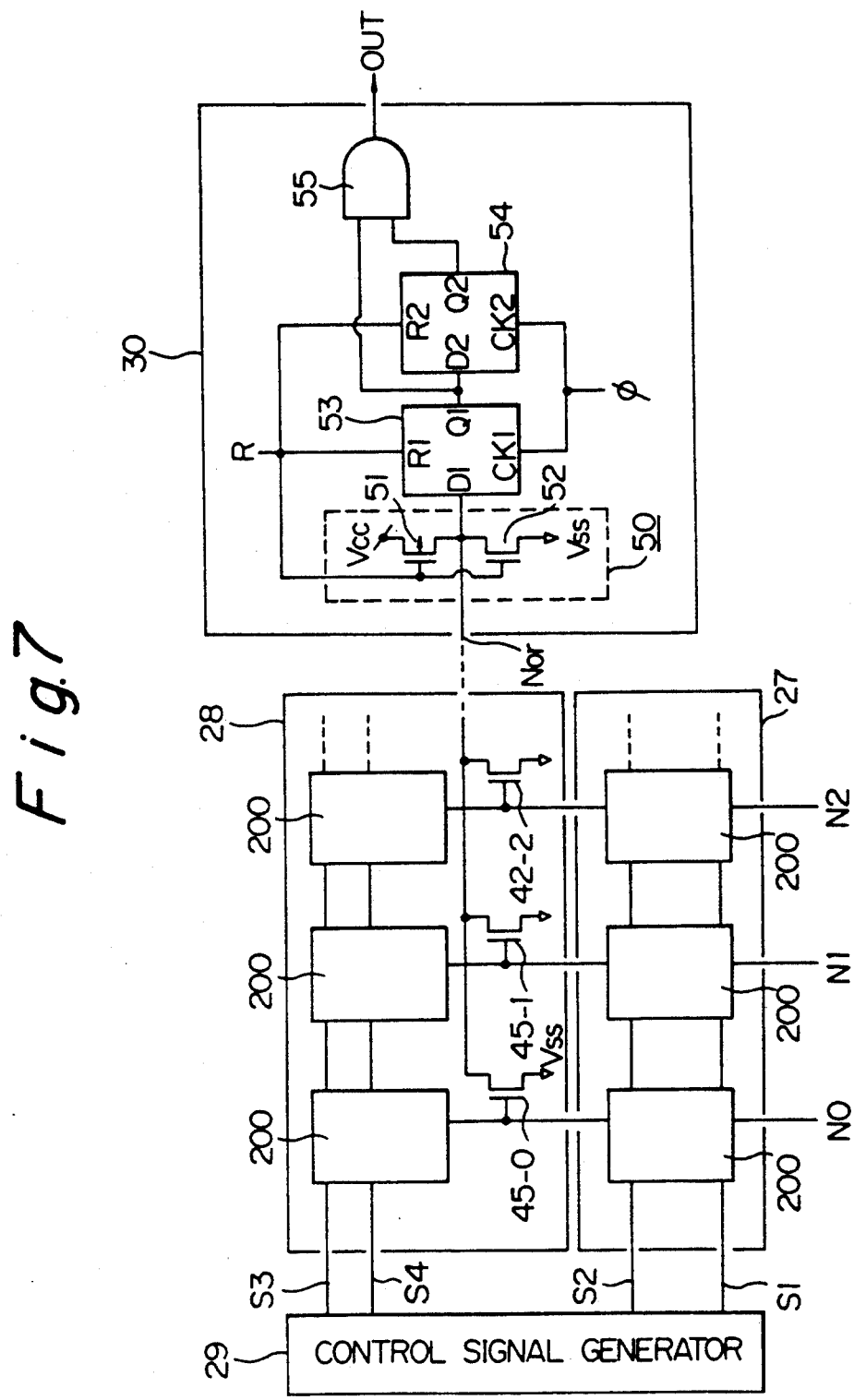
Figure 8:
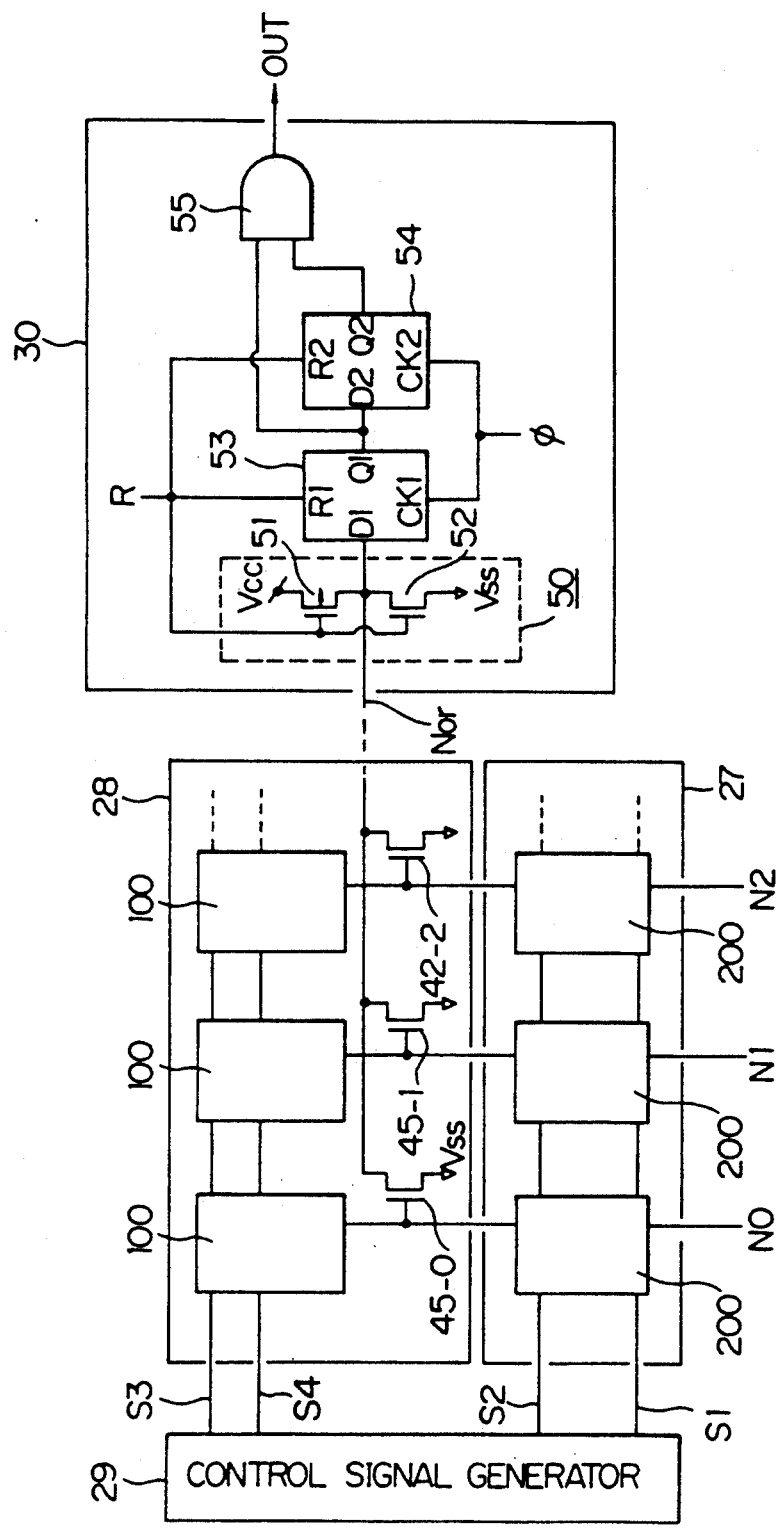

Forth to Sixth Embodiments (FIGS. 6 to 8)

Comparing and detecting circuits according to forth to sixth embodiments of the present invention will be described with reference to FIGS. 6 to 8.

The forth embodiment has devices 100 composed of the combination of FETs having FLOTOX structure and the other FETs and devices 300 composed of EPROMs.

The fifth embodiment has devices 200 composed of two FETs and the latch circuits.

The sixth embodiment has the combination 300.

The present invention is not limited to the comparing and detecting circuit according to first to sixth embodiments. It is possible to use the comparing and detecting circuit of the present invention for serving as various coincidence and determination, for example, by adding the bits or comprising devices other than the EEPROM for comparing one latch data to the other latch data, one data stored in the memory cell with the other data stored in the memory cell and the like.

What is claimed is:

1. A data coincidence detecting circuit for comparing comparison data composed of a plurality of bits with input data composed of a plurality of bits comprising:
    a plurality of nodes to each of which one respective bit of the input data is supplied;
    first, second, third and fourth control signal lines;
    a plurality of first storing means for storing the comparison data, each of said first means having a first control signal input coupled to said first control signal line a second control signal input coupled to said second control signal lines and a first storing element connected between the first control signal line and a respective one of said nodes to store the one bit of the comparison data, said first storing element being responsive to a second control signal on said second control signal line and electrically connecting or disconnecting the node to or from the first control signal line depending on the one bit of the comparison data stored in the first storing element;
    a plurality of second storing means for storing the input data, each corresponding to a respective one of the first storing means and a respective one of said nodes, each of said second means having a third control signal input to which a third control signal is applied via said third control signal line, a fourth control signal input to which a fourth control signal is applied via said fourth control signal line, and a second storing element connected between the third control signal input and the corresponding one of said nodes to store the one bit of the input data, said second storing element being responsive to the fourth control signal and electrically connecting or disconnecting the node to or from the third control signal line depending on the input data stored in the second element;

a comparison result output line;

a plurality of transistors each having a control line connected to a respective one of said nodes, a first electrode connected to a first potential source, and a second electrode connected to said comparison result output line; and a coincidence circuit having an output terminal and an input terminal connected to the comparison result output line, said coincidence circuit detecting the potential of the comparison result output line so as to determine that the input data coincides with the comparison data.

2. A data coincidence detecting circuit according to claim 1 further comprising a control signal generator coupled to said first, second, third, and fourth control signal lines and impressing thereon the first, second, third and fourth control signals.

3. A data coincidence detecting circuit according to claim 1, wherein the coincidence circuit comprises a potential detecting circuit having an output and an input connected to the comparison result output line, the potential detecting circuit detecting the potential on the comparison result output line in response to a reset signal to provide "H" or "L" signal to the output of the potential detecting circuit, and a coincidence judging circuit having an input terminal connected to the output of the potential detecting circuit, the coincidence judging circuit judging whether the input data coincides with the comparison data depending on the "H" or "L" signal and providing "H" or "L" level to the output terminal.

4. A data coincidence detecting circuit according to claim 3, wherein the potential detecting circuit comprises:

a first transistor having a first terminal connected to a second potential source, a second terminal connected to the output of the potential detecting circuit, and a control terminal connected to a reset line to which a reset signal is applied; and a second transistor having a first terminal connected to the first potential source, the second terminal connected to the output of the potential detecting circuit and a control terminal connected to the reset line.

5. A data coincidence detecting circuit according to claim 1, wherein the first means comprises:

a first FET having a first terminal connected to the corresponding node, a second terminal, and a control terminal connected to the second control signal line; and a second FET constituting an EEPROM device having a first terminal connected to the second terminal of the first FET, a second terminal and a control terminal.

6. A data coincidence detecting circuit for detecting the coincidence of first data having a plurality of bits with second data having a plurality of bits comprising:

a plurality of input lines, the bits of the first data being supplied to respective ones of said input lines;

a first storing circuit having a plurality of pairs of first and second terminals for controlling at least part of a path of controllable conductivity between the pair of first and second terminals, the first storing circuit having a plurality of first storing elements corresponding to said plurality of input lines and coupled to store the bits of the first data therein, each first storing element having an input terminal connected to the corresponding input line, and having a first electrode and a second electrode, the first storing element electrically coupling the first and second electrodes together when the stored bit is a first state and not coupling together the first and second electrodes when the stored bit is a second state;

a second storing circuit having a plurality of pairs of third and fourth terminals for controlling at least part of a path of controllable conductivity between the pair of third and fourth terminals, the second storing circuit having a plurality of second storing elements to store the bits of the second data therein, each second storing element having a third electrode and a fourth electrode, the second storing element electrically connecting between the third and fourth electrodes when the stored bit is the first state and disconnecting between the third and fourth electrodes when the stored bit is the second state, the third terminals being connected to the first terminals through nodes respectively;

a first power supplying circuit connected to the second terminals to selectively supply a first electric potential and a second electric potential;

a second power supplying circuit connected to the fourth terminals to selectively supply the first potential and the second potential;

a detecting circuit to detect the electric potential of the nodes and to output a detecting signal on an output terminal thereof, the detecting circuit having a plurality of detecting elements connected to the nodes respectively; and an output circuit connected to the output terminal for the detecting circuit to decide the coincidence of the comparison data and the input data by the detecting signal.

7. A data coincidence detecting circuit according to claim 6 wherein the first memory element has a latch circuit including an output terminal and a field effect transistor including a gate electrode connected to the output terminal of the latch circuit.

8. A data coincidence detecting circuit according to claim 7, wherein the first storing circuit comprises a switching circuit having a plurality of field effect transistors each of which has a fifth electrode connected to the second terminal and a sixth electrode connected to the second electrode of the first storing element.

9. A data coincidence detecting circuit according to claim 6 wherein the second memory element has a latch circuit including an output terminal and a field effect transistor including a gate electrode connected to the output terminal of the latch circuit.

10. A data coincidence detecting circuit according to claim 9 wherein the second storing circuit comprises a switching circuit having a plurality of field effect transistors each of which has a seventh electrode connected to fourth terminal and an eighth electrode connected to the fourth electrode of the second storing element.

11. A data coincidence detecting circuit according to claim 6 wherein the first memory element is an electrically erasable and programmable read only memory cell.

12. A data coincidence detecting circuit according to claim 11 wherein the first storing circuit comprises a switching circuit having a plurality of field effect transistors each of which has a ninth electrode connected to the first terminal of the first element and a tenth electrode connected to the node.

13. A data coincidence detecting circuit according to claim 6 wherein the second memory element is an electrically erasable and programmable read only memory cell.

14. A data coincidence detecting circuit according to claim 13 wherein the second storing circuit comprises a switching circuit having a plurality of field effect transistors each of which has an eleventh electrode connected to the third terminal of the second storing element and a twelfth electrode connected to the node.

15. A data coincidence detecting circuit according to claim 6 wherein the second memory element is an erasable programmable read only memory cell having a thirteenth electrode connected to the fourth terminal and a fourteenth electrode connected to the third terminal.

16. A data coincidence detecting circuit according to claim 6 wherein the detecting element is a field effect transistor having a gate connected to the node, a first electrode connected to ground and a second electrode connected to the output terminal of the detecting circuit.

17. A data coincidence detecting circuit according to claim 6 wherein the output circuit has a first flip-flop circuit including an input terminal connected to the output terminal of the detecting circuit and an output terminal, a second flip-flop circuit including an input terminal connected to the first flip-flop circuit and an output terminal and an AND gate having two input terminals connected to the output terminals of the first and second flip-flop circuits respectively.

18. A comparison circuit for comparing a set of bits of input data with a set of bits of comparison data comprising:
a control signal generator providing first, second, third and fourth control signals;
a common output line;
for each pair of one input data bit with its corresponding comparison data bit,
first, second, third and fourth integrated circuit devices each having a path of controllable conductivity, all of said paths being coupled in series,
the path of the first device being controlled by the bit of comparison data,
the path of the third device being controlled by the bit of input data,
the paths of the second and fourth devices being controlled by said second and fourth control signals, respectively,
said first and third control signals being coupled to the paths of controllable conductivity at the first and fourth devices, respectively,
the common output line being responsively coupled to a node along said paths coupled in series.

19. The circuit of claim 18 wherein said node is between said second and third devices, and further comprising an output circuit responsively coupled to said common output line.

20. The circuit of claim 19 wherein said generator provides and first, second, third, and fourth signals on respective lines coupled to said integrated circuit devices.

* * * * *